(No Model.)
W. E. A. PIPHER.
CLEVIS.
No. 589,478.　　　　　Patented Sept. 7, 1897.
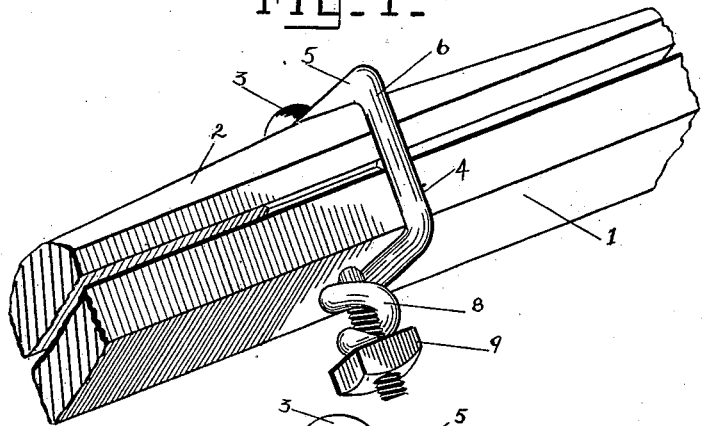
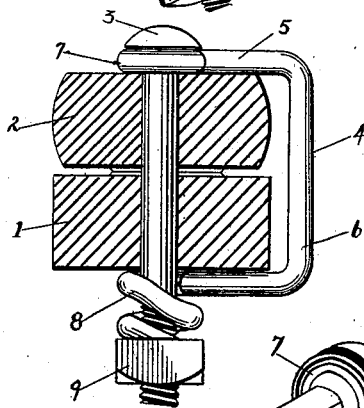
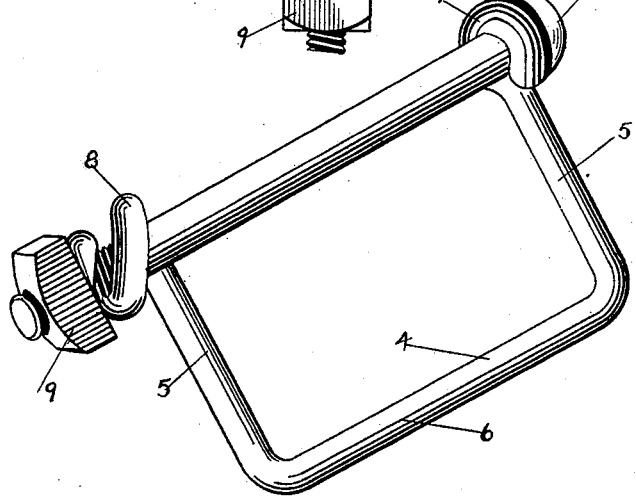
Witnesses  
L. R. Medcalf  
Edwin Cruse
Inventor  
William E. A. Pipher  
By his Attorneys,  
C. A. Snow & Co.

UNITED STATES PATENT OFFICE.

WILLIAM E. A. PIPHER, OF PARKERS LANDING, PENNSYLVANIA, ASSIGNOR OF ONE-THIRD TO A. A. MOORE, OF SAME PLACE.

CLEVIS.

SPECIFICATION forming part of Letters Patent No. 589,478, dated September 7, 1897.

Application filed May 20, 1897. Serial No. 637,427. (No model.)

*To all whom it may concern:*

Be it known that I, WILLIAM E. A. PIPHER, a citizen of the United States, residing at Parkers Landing, in the county of Armstrong and State of Pennsylvania, have invented a new and useful Clevis, of which the following is a specification.

This invention relates to certain improvements in clevises more especially designed for use in connecting the singletree of a buggy or similar vehicle with the cross-bar of the shafts; and the object of the invention is to provide a clevis which shall afford a spring-bearing for the nut of the connecting-bolt and exert a yielding pressure on the singletree and cross-bar to normally press them together and thereby prevent rattling of the singletree.

With this object in view the invention consists of the several details of construction and arrangement of the several parts, as will be hereinafter fully described, and particularly pointed out in the claims.

In the drawings, Figure 1 is a perspective view of portions of the cross-bar of a pair of shafts and the singletree, showing the application of my improved clevis. Fig. 2 is a transverse sectional view. Fig. 3 is a perspective view, on an enlarged scale, of the clevis detached.

Similar reference-numerals indicate similar parts in the several figures.

1 indicates the cross-bar, which is attached to the shafts in the usual manner, and 2 is the singletree. Both of these parts may be of any ordinary or suitable construction, and they are provided with central apertures for the passage of the retaining-bolt 3.

4 indicates the clevis, which is formed of stout wire, preferably steel, bent to the general shape of an ordinary clevis, and in which 5 indicates the horizontal arms, and 6 the vertical connecting-bar. The upper horizontal arm 5 is bent at its end to form an eye 7 for the passage of the retaining-bolt 3, and on which the head of the bolt is adapted to rest. The end of the lower horizontal arm 5 is coiled to form a vertically-arranged spring, as indicated at 8. In order to form this spring, the wire is preferably coiled to the right for the purpose of permitting the nut 9 to freely screw onto the threaded end of the bolt. When, however, the nut is screwed up tightly to compress the coiled spring 8, the end of the spring will bear with sufficient force upon the face of the nut to prevent the latter from being easily turned off the bolt by jarring.

In the ordinary manner of connecting the singletree to the cross-bar, whether with or without a clevis, the nut on the retaining-bolt has to be screwed up so tightly, in order to prevent the singletree from rattling, that the singletree is clamped to the cross-bar so tightly that it can scarcely work, and as soon as it begins to work freely it will also begin to rattle. This difficulty is overcome by the use of my invention, for the coiled spring 8, when compressed by the nut 9, will cause the horizontal arms of the clevis to bear, respectively, against the singletree and the cross-bar with a yielding pressure, which will effectually prevent rattling, but at the same time permit the singletree to work freely, and any wear that may occur will be taken up by the natural expansion of the spring.

A clevis made in accordance with my invention will also present a neater appearance than the ordinary clevis, for as it is made of spring-steel wire it will not need to be so heavy as the ordinary clevis and will at the same time possess sufficient strength for all ordinary purposes.

While I have described my invention as being used to connect a singletree to the cross-bar of the shafts, it is equally capable of use for the purpose of connecting a singletree to a doubletree in double rigs.

It will be understood that changes in the form, proportion, and the minor details of construction may be resorted to without departing from the spirit or sacrificing any of the advantages of this invention.

Having thus described the invention, what I claim is—

1. A clevis formed from a piece of spring-steel wire and having an eye formed at the end of one of its horizontal arms, and a vertically-arranged coiled spring at the end of its other horizontal arm and integral therewith, substantially as described.

2. The combination with the cross-bar, of a pair of shafts, the singletree, and the retaining-bolt, of a clevis formed of a piece of spring-wire the upper horizontal arm of which engages the upper face of the singletree and is provided with an eye at its end for the passage of the retaining-bolt, and the lower horizontal arm of which engages the lower face of the cross-bar and has its end bent to form a vertically-arranged coiled spring through which the end of the bolt passes, and a nut working on the end of the bolt to engage and compress the coiled spring, substantially as and for the purpose specified.

In testimony that I claim the foregoing as my own I have hereto affixed my signature in the presence of two witnesses.

WM. E. A. PIPHER.

Witnesses:
W. G. MCGLAUGHLIN,
ALFRED JEWELL.